United States Patent
Möbusz et al.

(10) Patent No.: US 9,693,121 B2
(45) Date of Patent: Jun. 27, 2017

(54) METHOD FOR DATA TRANSMISSION BETWEEN MEASURING APPARATUSES AND A DATA PROCESSING DEVICE IN A MEASURED DATA RECORDING SYSTEM

(71) Applicant: Dräger Safety AG & Co. KGaA, Lübeck (DE)

(72) Inventors: Andreas Möbusz, Lübeck (DE); Johannes Müller, Lübeck (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 0 days.

(21) Appl. No.: 15/095,682

(22) Filed: Apr. 11, 2016

(65) Prior Publication Data

US 2016/0309242 A1    Oct. 20, 2016

(30) Foreign Application Priority Data

Apr. 14, 2015    (DE) .......................... 10 2015 004 578

(51) Int. Cl.
| | |
|---|---|
| *G08C 19/22* | (2006.01) |
| *H04Q 9/00* | (2006.01) |
| *H04L 29/08* | (2006.01) |

(52) U.S. Cl.
CPC .............. *H04Q 9/00* (2013.01); *H04L 67/12* (2013.01); *H04Q 2209/30* (2013.01)

(58) Field of Classification Search
CPC ....... H04Q 9/00; H04Q 2209/30; H04L 67/12
See application file for complete search history.

(56) References Cited

U.S. PATENT DOCUMENTS

| | | | | |
|---|---|---|---|---|
| 2005/0208908 A1* | 9/2005 | Karschnia | .............. | G08C 17/00 455/127.1 |
| 2005/0278074 A1* | 12/2005 | Junk | ...................... | F15B 5/006 700/282 |
| 2009/0010203 A1* | 1/2009 | Pratt, Jr. | ................. | H04L 12/66 370/328 |

(Continued)

FOREIGN PATENT DOCUMENTS

| | | |
|---|---|---|
| DE | 102 49 851 A1 | 5/2004 |
| DE | 600 18 209 T2 | 1/2006 |

(Continued)

*Primary Examiner* — Erin File
(74) *Attorney, Agent, or Firm* — McGlew and Tuttle, P.C.

(57) ABSTRACT

A method for data transmission, between measuring apparatuses (5) and a data processing device (3, 3') in a measured data recording system (1, 1') with a controller (7, 7'), includes repeated execution of exchange steps by the controller. The exchange steps include reception of analog measured signals from the measuring apparatuses (5) and/or the digital exchange of digital messages between the measuring apparatuses and the controller (7, 7'). The exchange steps are started with a predefined time lag. A digital data packet is sent by the data processing device (3, 3') to the controller. The digital data packet contains the code of one of the plurality of measuring apparatuses (5) and a digital message. The controller extracts the code from the digital data packet by the controller (7, 7') and sends the digital message to the one of the plurality of measuring apparatuses, after the completion of the digital exchange.

16 Claims, 2 Drawing Sheets

(56) References Cited

U.S. PATENT DOCUMENTS

| | | | | |
|---|---|---|---|---|
| 2011/0053526 A1* | 3/2011 | Strei | ............... | H05K 5/064 455/90.3 |
| 2011/0131455 A1* | 6/2011 | Law | ............... | H04B 3/548 714/40 |
| 2015/0081922 A1* | 3/2015 | Brett | ............... | H04W 8/245 709/230 |
| 2015/0127876 A1* | 5/2015 | Erni | ............ | G05B 19/4185 710/315 |
| 2015/0156285 A1* | 6/2015 | Blair | ............ | H04L 12/4633 709/201 |
| 2015/0296619 A1* | 10/2015 | Rooyakkers | ........... | H05K 1/117 361/760 |
| 2015/0379865 A1* | 12/2015 | Kawamoto | ............ | G08B 29/12 340/516 |
| 2016/0156698 A1 | 6/2016 | Kolblin et al. | | |

FOREIGN PATENT DOCUMENTS

| | | |
|---|---|---|
| DE | 10 2008 019 040 A1 | 10/2008 |
| DE | 10 2013 107 905 A1 | 1/2015 |
| EP | 1 253 494 A2 | 10/2002 |
| EP | 1 420 341 A1 | 5/2004 |
| EP | 2 315 089 A1 | 4/2011 |

* cited by examiner

METHOD FOR DATA TRANSMISSION BETWEEN MEASURING APPARATUSES AND A DATA PROCESSING DEVICE IN A MEASURED DATA RECORDING SYSTEM

CROSS REFERENCE TO RELATED APPLICATIONS

This application claims the benefit of priority under 35 U.S.C. §119 of German Patent Application 10 2015 004 578.4 filed Apr. 14, 2015, the entire contents of which are incorporated herein by reference.

FIELD OF THE INVENTION

The present invention pertains to a method for data transmission between measuring apparatuses and a data processing device in a measured data recording system, which has a plurality of measuring apparatuses and at least one controller, wherein an unambiguous code is assigned to each of the plurality of measuring apparatuses and wherein a measuring line is provided between each measuring apparatus and the controller, the measuring apparatuses send analog measured signals to the controller via the measuring lines and digital messages are exchanged via the measuring lines between the controller and the measuring apparatuses.

BACKGROUND OF THE INVENTION

It is known from the state of the art that a plurality of measuring apparatuses, which are arranged distributed in space, can be connected via measuring lines to a central controller. Each of the measuring apparatuses has at least one measuring element, with which a measured value is measured. This measured value is transmitted to the controller in analog form, i.e., as an analog current or voltage signal, because analog transmissions are often more robust than digital ones. To poll or set additional parameters of the measuring apparatuses at the same time, the controller can communicate via the measuring line digitally with such measuring apparatuses, which are set up for such digital communication and which are, in addition, connected to a terminal of the controller, which terminal is designed for this. The controller sends for this a digital message to a communication element of the measuring apparatus, which element can, in turn, respond to the digital message of the controller with a digital message of its own. For example, a higher-frequency signal, for example, at 1,200 Hz or 2,200 Hz, can be modulated for this onto the analog current or voltage signal, with which a measured value is transmitted from the measuring apparatus to the controller. The digital messages may be used, for example, to poll a state of a measuring apparatus or to perform a calibration of the measuring apparatus.

One example of such a system comprising a plurality of measuring apparatuses and a central controller is a distributed gas-measuring unit, in which a plurality of gas-measuring sensors are arranged distributed as measuring apparatuses over a production plant. The gas-measuring sensors measure, for example, a concentration of an explosive gas or of a gas that is hazardous to health in the ambient air and report the measured concentrations to the central controller. The HART protocol is an example of a communication protocol, according to which the communication can be handled between the controller and the measuring apparatuses.

The communication via the HART protocol or the digital communication via the analog measuring line may, however, also be used to maintain or even calibrate the measuring apparatuses. Portable data processing devices, such as laptops or mobile telephones, are regularly equipped for this with special hardware, which makes it possible to directly connect the data processing device to a measuring apparatus via a line. For example, the connection between the measuring apparatus and the central controller is cut first for this, and the measuring apparatus is connected, instead, directly to the data processing device. However, this requires a large amount of time and great technical effort. On the one hand, expensive special hardware is needed, which can communicate via the HART protocol, and, on the other hand, a maintenance technician must have access to each measuring apparatus to establish a physical connection to the measuring apparatus and to carry out the maintenance and calibration on site.

In addition, the measuring apparatuses can be connected to the data processing device via the controller, so that it is no longer necessary for the maintenance technician to have at least direct access to the measuring lines running to the measuring apparatuses. However, this procedure has the drawback that either the entire measuring system must be put out of operation for the maintenance or calibration and safety-relevant functions may possibly be deactivated during the time of the maintenance or calibration of individual measuring apparatuses, or at least some terminals of the controller and the measuring apparatuses connected thereto must be deactivated, so that at least these measuring apparatuses will now be out of operation.

SUMMARY OF THE INVENTION

Therefore, an object of the present invention is to provide communications in a measured data recording system described in the introduction, with which individual measuring apparatuses can be calibrated or tested or configured from the outside even during the ongoing monitoring operation.

According to the present invention, a method is provided for data transmission between measuring apparatuses and a data processing device in a measured data recording system, wherein the system has a plurality of measuring apparatuses and at least one controller, wherein an unambiguous code is assigned to each of the plurality of measuring apparatuses, wherein a measuring line is provided between each measuring apparatus and the controller, the measuring apparatuses send analog measured signals via the measuring lines to the controller and digital messages are exchanged via the measuring lines between the controller and the measuring apparatuses, wherein the controller has a terminal, via which the data processing device is connected to the controller, so that the controller receives digital data packets from the data processing device and sends digital data packets to the data processing device, and wherein the method comprises the following:

Exchange steps are carried out repeatedly by the controller, an exchange step comprising the reception of analog measured signals from the measuring apparatuses and/or the digital exchange of digital messages between the measuring apparatuses and the controller and the exchange steps being started after a predefined time lag, sending of a first digital data packet by the data processing device to the controller, the first digital data packet containing the code of one of the plurality of measuring apparatuses and a first digital message, extraction of the code from the digital data packet by the controller, and sending of the first digital message to one of the plurality of measuring apparatuses by the controller after the completion of the digital exchange.

The analog measured signals can be polled repeatedly by the controller at predefined time lags within the framework of the exchange steps in the method according to the present invention and checked to determine whether threshold values are possibly exceeded, so that an alarm can be outputted. The time lag is preferably always the same. However, the interval between the start of two consecutive exchange steps may vary. In addition, a digital communication, namely, a digital exchange, can take place between the measuring apparatuses and the controller within the framework of the exchange step. The digital messages can be transmitted in such a way that a higher-frequency signal is modulated for the digital data transmission to the analog current or voltage signal, with which the measured value measured by a measuring unit is transmitted.

Digital messages, which are contained in data packets sent to the controller by the data processing device and whose code was likewise contained in the digital data packet, are sent by the controller to the measuring apparatus during the period left between the digital exchanges. These digital messages may be calibration commands or other pollings or commands. The operation proper of the controller is not interrupted in the method according to the present invention.

Thus, the controller advantageously functions, in addition, as a mediator between two different transmission protocols. While the data processing device is, for example, a conventional PC or laptop, which have a network card and are thus inexpensive, the controller assumes all communication with the measuring apparatuses.

In a preferred embodiment of the method according to the present invention, one measuring apparatus sends to the controller a digital reply message as a reply to the first digital message sent by the controller, and the controller sends the digital reply message in a digital reply data packet to the data processing device. It is thus made possible that the data processing device receives an acknowledgment from the measuring apparatus, which was addressed with the digital data packet sent originally, during the ongoing operation of the measured data recording system. However, the method may be operated in a flexible duplex mode, in which a reply to a digital message does not always have to be waited for before the next digital message can be sent by the data processing device in a data packet.

Furthermore, it is preferred if after the completion of a digital exchange, the controller determines the free time that remains until the start of the next digital exchange, and compares it with a first transmission time, which is needed for transmitting the first digital message to the one measuring apparatus, the first digital message being sent if the free time is longer than the first transmission time, and the transmission of the first digital message takes place after passing through the next digital exchange, when the free time is shorter than the next transmission time.

It is ensured in this way that a transmission operation for transmitting the first digital message is started only when the time remaining for it until the next exchange step is also sufficient. It should be borne in mind in this connection that the digital exchange varies because of the different lengths of the particular messages transmitted between the controller and the measuring apparatuses and because of the repetitions necessary because of the great distances in space between the controller and the measuring apparatuses. The durations of the digital exchange will therefore differ, and this is utilized in the present preferred embodiment by delaying a transmission of a digital message sent by the data processing device until sufficient time will be available for it.

It is, furthermore, preferred according to the invention if the first digital message is stored in a shift register, and after completing a digital exchange, the controller determines the free time that remains until the start of the next digital exchange and compares it with a first transmission time, which is needed for transmitting the next digital message outputted from the shift register to the one measuring apparatus, and wherein the next digital message outputted from the shift register is transmitted and deleted from the shift register if the free time is longer than the first transmission time. The fact that the digital messages are also outputted again in the order in which they are entered into the memory is utilized in a shift register. The shift register is thus used consequently as a buffer, which does not, however, change the order in which the digital messages are sent compared to the order in which they are entered in the controller.

When a second digital data packet is sent by the data processing device to the controller, and the second digital data packet contains the code of a second of the plurality of measuring apparatuses and a second digital message, the second digital message is stored in the shift register, and if no additional digital massagers are being stored in the shift register, the controller compares the remaining second free time that remains until the next digital exchange with a second transmission time, which is needed for sending the second digital message to the second measuring apparatus, and the second digital message is sent to the second measuring apparatus and is deleted from the shift register, and if additional digital messages are present in the shift register, the second free time, which remains until the next digital exchange, is compared with the transmission time that is needed for sending the next digital message outputted from the shift register, and this message is sent and deleted from the shift register if the second free time is longer than this transmission time.

It is thus made possible to efficiently process a plurality of digital data packets arriving at the controller during the time available between the digital exchange steps.

In another preferred embodiment of the method according to the present invention, the data processing device sends a digital data packet to the controller, wherein the digital data packet contains the code of one of the plurality of measuring apparatuses, a start signal and a first digital message, wherein the repeated execution of the digital exchange is interrupted by the controller, wherein the controller extracts the code from the digital data packet and sends the digital message to the one measuring apparatus, wherein the data processing device sends additional digital data packets with digital messages to the controller and the controller sends the digital messages to the one measuring apparatus, wherein the data processing device sends a digital data packet to the controller and wherein the repeated execution of the digital exchange, which is started with a predefined time lag, is resumed by the controller.

The normal operation of the measured data recording system can be interrupted in this embodiment for the communication between at least one measuring apparatus and the data processing device, and a tunnel is built up between the data processing device and the measuring apparatus after the reception of the start signal and then, the transmission is not interrupted by the exchange steps.

The present invention will be described below on the basis of a drawing showing only preferred exemplary embodiments. The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

Figure 1:
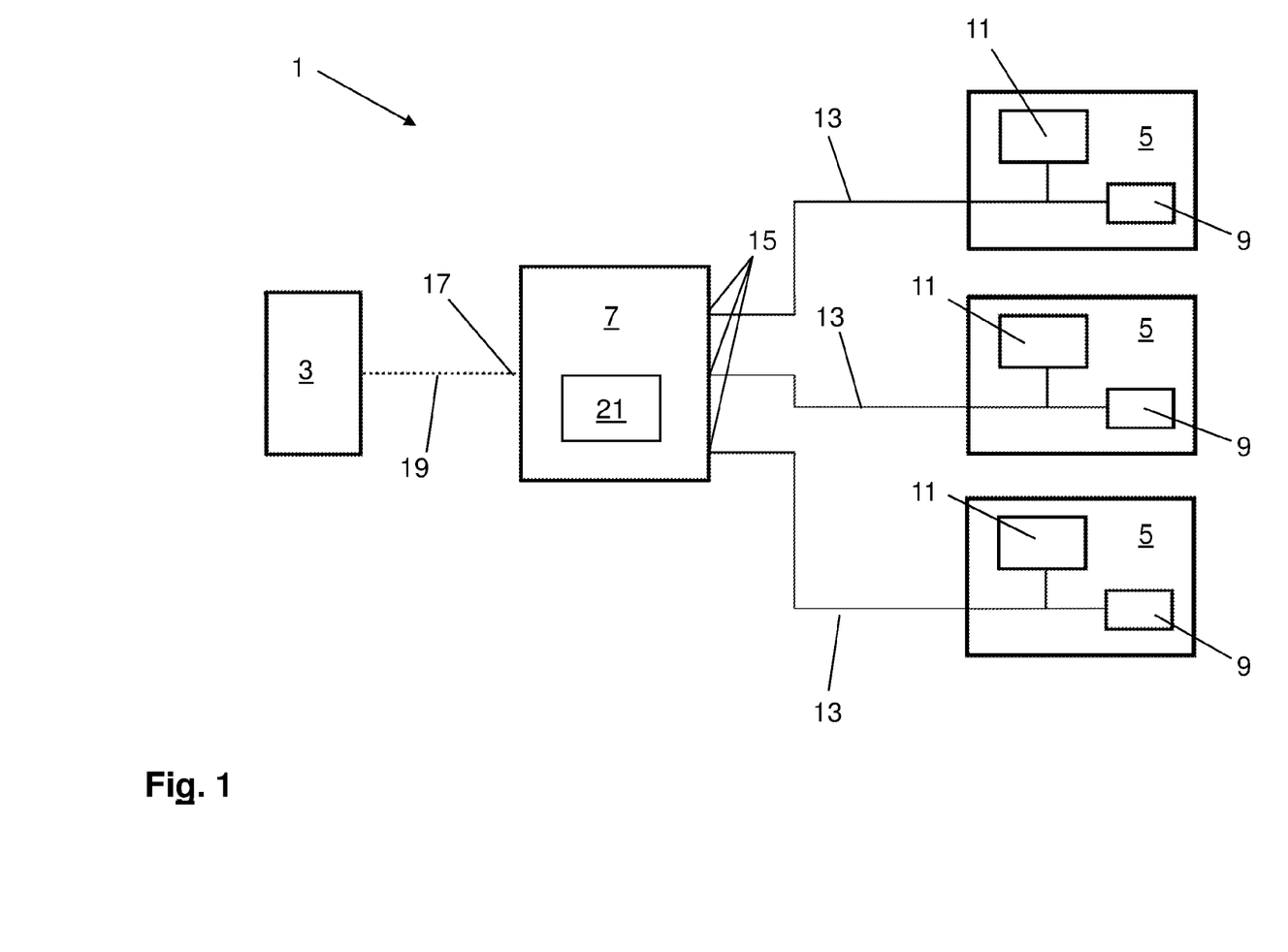
FIG. 1 is a schematic view of a first exemplary embodiment of a measured data recording system for carrying out the method according to the present invention.

With reference to FIG. 1, a first exemplary embodiment of a measured data recording system 1 for providing a possibility of communication between a data processing device 3 and three measuring apparatuses 5 via a controller 7 is described, wherein an exemplary embodiment of a method according to the present invention is carried out herewith. The data processing device 3 may be, for example, a PC, such as a laptop, a tablet computer or a smart phone.

Each of the measuring apparatuses 5, which are, for example, gas-measuring apparatuses 5 for measuring the concentration of a gas in an ambient air, has a measuring element 9 and a communication element 11. The measuring apparatuses 5 are connected to terminals 15 of the controller 7 via analog measuring lines 13. The measuring elements 9 are configured to determine, for example, the concentrations of an explosive gas or of a gas that is hazardous to health in the ambient air. The determined concentration, i.e., the determined measured value, is transmitted to the controller 7 as an analog voltage or current signal via the measuring lines 13 and the terminals 15. The use of analog voltage or current signals for the analog transmission of the measured or determined measured values has proved to be especially robust.

However, the measuring apparatuses 5 also have at the same time the communication elements 11, which are likewise connected to the analog measuring line 13 and can exchange digital messages with the controller 7 via this measuring line 13. For example, a controller 7 may be configured to poll a state of a measuring apparatus 5 by means of a digital message. To transmit digital messages via the analog measuring lines 13, a higher-frequency data signal is modulated onto the analog voltage or current signal, and frequencies of 1,200 Hz or 2,200 Hz can be used. The communication between the controller 7 and the measuring apparatuses 5 may be carried out, for example, according to the HART protocol. Even though this is not shown in FIG. 1, the system 1 may comprise additional elements or units, which are likewise connected to the measuring apparatuses 5 or the controller 7 via the measuring lines 13 and likewise communicate with one another and with the measuring apparatuses 5 and the controller 7 by means of the HART protocol. The HART protocol contains for this so-called arbitration rules, according to which it is determined under which conditions competing HART-capable devices can communicate with one another.

A code or address is assigned to each of the measuring apparatuses 5 connected to the controller 7, this assignment of the address preferably being effected as a function of an unambiguous code of the measuring apparatus 5, for example, a MAC (Media Access Controller) address. The controller 7 thus may be configured to assign and send digital messages to the different measuring apparatuses 5 via the address or code unambiguously, independently from the particular terminal 15 to which the particular measuring apparatus 5 is connected. The values determined or measured by the measuring elements 9 are prevented in this manner from being assigned to incorrect measuring sites in case a measuring apparatus 5 is connected to an incorrect terminal 15.

The controller 7 comprises, furthermore, a terminal 17, via which the controller 7 is configured to be connected to the data processing device 3. In the exemplary embodiment shown in FIG. 1, the terminal 17 is a usual Ethernet port, to which the data processing device 3 is connected with an Ethernet cable 19.

However, the terminal 17 may be, for example, a WLAN module, a Bluetooth module or another wireless module and the data processing device 3 is connected to the controller 7 in a wireless manner. The communication between the controller 7 and the data processing device 3 takes place in the exemplary embodiment according to a predefined protocol. Both the data processing device 3 and the controller 7 have a network card, via which they can receive and send TCP/IP (Transmission Control Protocol/Internet Protocol) data packets.

Finally, a shift register 21 configured as a first-in-first-out memory is provided in the controller 7, i.e., messages being stored therein are also outputted again in the order in which they were entered into the shift register.

Exchange steps are carried out by the controller 7 with a predefined time lag in the exemplary embodiment of the method according to the present invention for data transmission between the measuring apparatuses 5, the controller 7 and the data processing device 3 in the measured data recording system 1, the time lag preferably being constant here and an exchange step comprising the reception of analog measured signals from the measuring apparatuses 5 and/or the digital exchange of digital messages between the measuring apparatuses 5 and the controller 7. This exchange of digital messages may comprise, among other things, the polling of operating parameters of the measuring elements 9 of the measuring apparatuses 5. In addition, the measured values for a gas concentration, which are transmitted by means of an analog voltage or current signal can be compared with threshold values within the framework of an exchange step and actuators, such as warning lights or sirens, may possibly be activated if threshold values are exceeded. The exchange steps consequently contain the steps necessary for the normal continuous operation of the measured data recording system 1.

The data processing device 3 can send a first digital data packet via the connection 19 and the terminal 17 to the controller 7 during the repeated periodic execution of the exchange steps, and this first digital data packet contains in a header the code of one of the measuring apparatuses 5 and a first digital message as a payload.

After the completion of the digital exchange, the controller 7 extracts the code from the first digital data packet and stores the first digital message contained in the first digital data packet together with the code in the shift register 21. A digital message being stored there is subsequently read again from the shift register 21 and, unless additional digital messages were already being stored there, the message stored immediately before is outputted again (and thus deleted in the shift register) and sent to the measuring apparatus 5 to which the extracted code is assigned.

The first digital message contained in the first digital data packet may be a control command, for example, for calibration, which is detected by the communication element 11 and transmitted to the control of the measuring apparatus 5.

Since the sending takes place after the completion of the digital exchange and before the subsequent exchange step, the normal operation of the measured data recording system 1 is not interfered with thereby.

To ensure, nevertheless, that there will be no interruption in the normal operation, the free time that remains until the start of the next digital exchange is first determined by the controller 7 after the completion of the digital exchange and after reception of the first digital data packet, and this free time is compared with a first transmission time, which is needed for sending the digital message outputted as the next message, in this case the first message, from the shift register 21 to the measuring apparatus 5.

The next digital message is actually read from the shift register 21 only if the free time is longer than the first transmission time, and it is still sent already before the next exchange step. Otherwise, if the free time is shorter than the first transmission time, the transmission of the first digital message takes place at the earliest after the next digital exchange is performed.

The further free time remaining until the next following digital exchange is determined after the next exchange step and if a message is being stored in the shift register 21 and compared with the transmission time that is needed to send the digital message still being stored in the shift register 21. This stored message, which is possibly the first digital message, is sent to the first measuring apparatus and deleted from the shift register 21 if the remaining free time is longer than the first transmission time. The digital message otherwise remains first in the shift register until the next digital exchange step is carried out.

It should be noted in this connection that the duration of the digital exchange step varies because of differences in the lengths of the messages transmitted between the controller 7 and the measuring apparatuses 5 and because of the repetitions necessary because of the great distances in space between the controller 7 and the measuring apparatuses 5. The durations of the digital exchange steps will therefore vary, and this is utilized in the embodiment of the method according to the present invention being described here by a transmission of a digital message being sent by the data processing device 3 being delayed until sufficient time becomes available for it.

If a second data packet, which contains the code of a second measuring apparatus 5 and a second digital message, is sent by the data processing device 3 to the controller 7 after the first digital data packet, the second digital message is stored together with the code in the shift register 21 after the extraction.

If no additional digital messages are being stored in the shift register 21, the controller 7 subsequently determines the remaining second free time remaining until the next digital exchange step. This second free time is compared with a second transmission time, which is needed for sending the second digital message to the second measuring apparatus 5, and the second digital message is sent to the second measuring apparatus 5 (and deleted from the shift register 21) if the second free time is longer than the second transmission time. The second digital message otherwise remains in the shift register 21 until the next digital exchange step has been carried out.

If digital messages are still present in the shift register 21, the second free time is compared with the transmission time, which is needed for sending the next digital message outputted from the shift register 21, and this message is sent if the second free time is longer than this transmission time. This procedure is repeated as long as the still remaining free time is longer than the transmission time of the digital message outputted as the next message from the shift register 21.

If the measuring apparatus 5 to which a digital message was sent sends a digital reply message to the controller 7, the controller 7 sends the digital reply message in a digital reply data packet back to the data processing device 3. An acknowledgment can thus be transmitted to a status query or a calibration command to the data processing device 3.

On the whole, the data transmission taking place between the controller 7 and the measuring apparatuses 5 within the framework of the exchange steps is not compromised during the above-described communication between the data processing device 3 and the measuring apparatuses 5.

In addition, it is also possible that the data processing device 3 sends a digital data packet to the controller 7, and this digital data packet contains the code of at least one of the measuring apparatuses 5, a start signal and a first digital message. Based on the start signal contained in this data packet, the repeated execution of the digital exchange is interrupted by the controller 7, and the controller 7 extracts the code from the digital data packet and sends the digital message directly to the measuring apparatus 5, to which the code contained in the data packet is assigned.

The data processing device 3 then sends additional digital data packets with digital messages to the controller 7, and the controller 7 forwards these digital messages to the measuring apparatus 5 to which the code from the first data packet is assigned. A plurality of digital messages, which may contain, for example, a firmware update for a measuring apparatus 5, can be sent in this way to a certain measuring apparatus 5, and the regular execution of the digital exchange steps is interrupted in this case, but analog measured signals continue to be received.

Finally, the data processing device 3 can transmit a digital data packet with a digital message and with an end signal to the controller 7, after which the repeated execution of digital exchange steps is resumed by the controller 7, e.g., operation is again changed over to normal operation.

Figure 2:
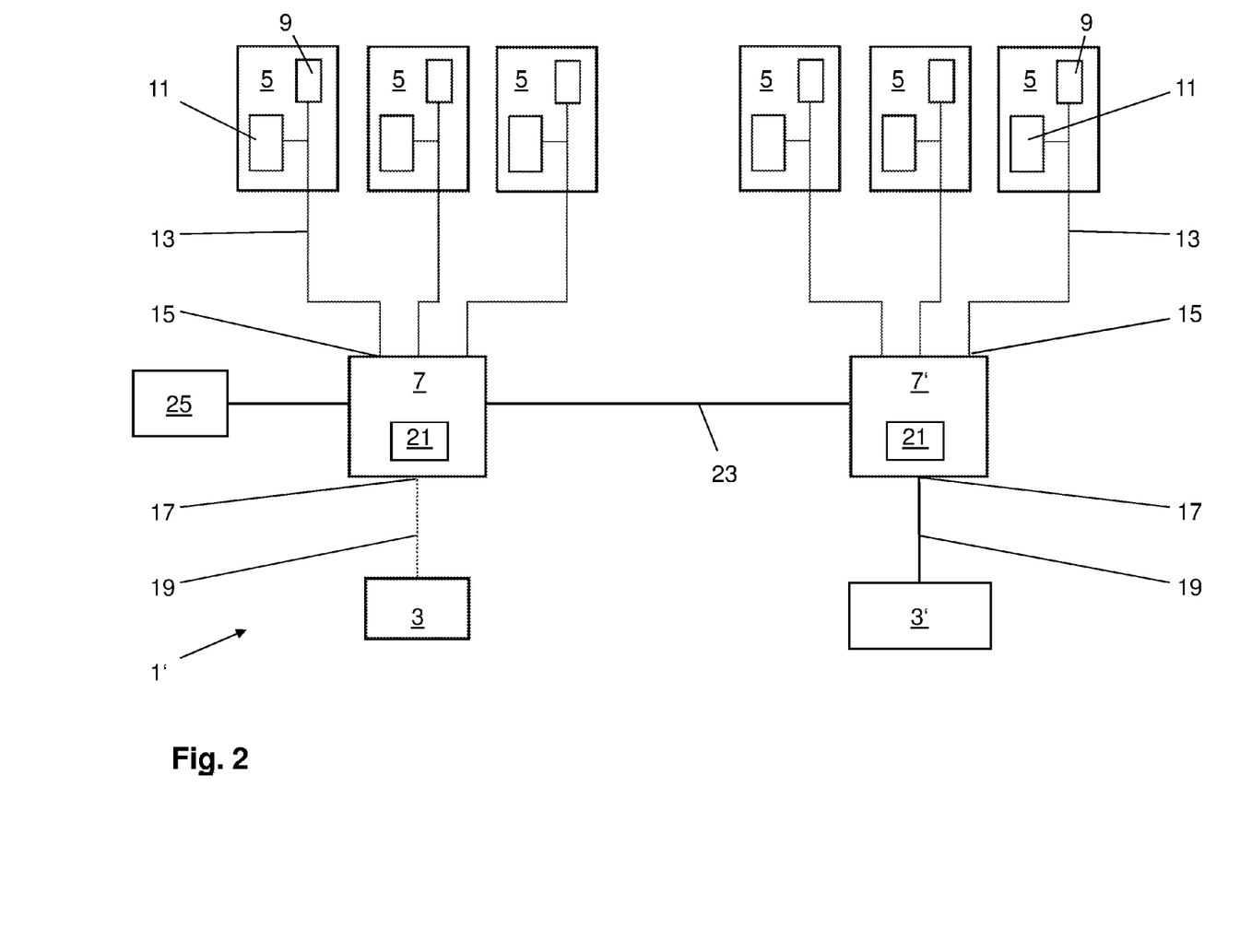
FIG. 2 is a schematic view of a second exemplary embodiment of a measured data recording system for carrying out the method according to the present invention.

The second exemplary embodiment of a measured data recording system 1' shown in FIG. 2 also comprises, in addition to a first controller 7, a second controller 7', which is connected to the first controller 7 via a cable connection 23 and with which a data processing device 3' is likewise connected via a terminal 17 and a line 19. A plurality of measuring apparatuses 5 are likewise connected via measuring lines 13 to the second controller 7'. Finally, this measured data recording system 1' also has an actuator 25, for example, in the form of a warning light. This is activated when one of the controllers 7, 7' determines that a threshold value was exceeded during a comparison of a threshold value with a concentration value detected by one of the measuring apparatuses 5.

The method explained above in connection with the measured data recording system 1 from FIG. 1 may also be carried out in the same way with the measured data system 1' from FIG. 2.

However, the procedure followed in this case is such that if the data processing device 3, which is connected to the first controller 7, sends a digital data packet, which contains a code that is assigned to a measuring apparatus 5 connected to the second controller 7', to the controller 7, the digital message is forwarded first to the second controller 7', in which the further steps of the method will then be carried out. This means that the digital message will then be stored in the shift register 21 of the second controller 7' and read from this shift register if the condition explained above for the free time is met in the second controller 7'.

In reference to the digital data packet sent first by the first data processing device 3, the further process step will then be carried out in the second controller 7', and a reply message sent by the measuring apparatus 5 connected to the second controller 7' is transmitted to the first controller 7 and is then sent to the first data processing device 3.

An analogous procedure is followed if the second data processing device sends a digital data packet to the second controller 7', which data packet contains a code, which is assigned to a measuring apparatus 5 that is connected to the first controller 7. The first controller 7 assumes the execution of the method steps in this case, and reply messages are sent to the second controller 7', which will then forward these to the second data processing device 3'. It should pointed out here that the present invention is not limited to the use of one or two controllers 7, 7', but a larger number of controllers may be used in the measured data recording system as well.

While specific embodiments of the invention have been shown and described in detail to illustrate the application of the principles of the invention, it will be understood that the invention may be embodied otherwise without departing from such principles.

What is claimed is:

1. A method for data transmission between measuring apparatuses and a data processing device in a measured data recording system, which has a plurality of measuring apparatuses and at least one controller, the method comprising the steps of:
   assigning an unambiguous code to each of the plurality of measuring apparatuses;
   providing a measuring line between each measuring apparatus and the controller for sending analog measured signals by the measuring apparatuses to the controller via the measuring lines and exchanging digital messages, via the measuring lines, between the controller and the measuring apparatuses;
   connecting the data processing device to the controller via a terminal of the controller for receiving digital data packets at the controller from the data processing device and sending digital data packets to the data processing device;
   repeatedly executing exchange steps by the controller, wherein an exchange step comprises:
   a reception of analog measured signals from the measuring apparatuses; or
   a digital exchange of digital messages between the measuring apparatuses and the controller; or
   both the reception of analog measured signals from the measuring apparatuses and the digital exchange of digital messages between the measuring apparatuses and the controller;
   starting each of the exchange steps after a predefined time lag;
   sending of a first digital data packet by the data processing device to the controller, wherein the first digital data packet contains the unambiguous code of one of a plurality of measuring apparatuses and a first digital message;
   extracting of the unambiguous code from the first digital data packet by the controller; and
   sending of the first digital message to the one of the plurality of measuring apparatuses by the controller after a completion of one of the exchange steps.

2. A method in accordance with claim 1, wherein the one measuring apparatus sends a digital reply message, as a reply to the first digital message sent by the controller, to the controller and the controller sends the digital reply message in a digital reply data packet to the data processing device.

3. A method in accordance with claim 1, wherein:
   the controller determines a free time that remains until a start of a next exchange step after a completion of an exchange step and compares the free time that remains with a first transmission time, which is needed for sending the first digital message to the one measuring apparatus;
   the first digital message is sent if the free time is longer than the first transmission time, and
   the sending of the first digital message takes place after the execution of the next exchange step if the free time is shorter than the first transmission time.

4. A method in accordance with claim 1, wherein:
   the first digital message is stored in a shift register;
   the controller determines, after the completion of an exchange step, a free time that remains until a start of a next exchange step and compares the free time with a first transmission time that is needed for sending a next digital message to be output by the shift register to a measuring apparatus; and
   the next digital message to be output by the shift register is sent and deleted from the shift register if the free time is longer than the first transmission time.

5. A method in accordance with claim 4, wherein:
   a second digital data packet is sent by the data processing device to the controller;
   the second digital data packet contains the code of a second of the plurality of measuring apparatuses and a second digital message;
   the second digital message is stored in the shift register;
   if no additional digital messages are being stored in the shift register, the controller compares a second free time, that remains until the next exchange step, with a second transmission time that is needed for sending the second digital message to the second measuring apparatus;
   the second digital message is sent to the second measuring apparatus and is deleted from the shift register if the second free time is longer than the second transmission time; and
   if additional digital messages are present in the shift register, the second free time that remains until the next exchange step is compared with the transmission time that is needed for sending the next digital message outputted from the shift register, and the next digital message is sent and is deleted from the shift register if the second free time is longer than the transmission time needed for sending the next digital message.

6. A method in accordance with claim 1, wherein:
the data processing device sends a digital data packet to the controller;
the digital data packet contains the code of one of the plurality of measuring apparatuses, a start signal and a first digital message;
the repeated execution of the exchange steps is interrupted by the controller;
the controller extracts the code from the digital data packet and sends the digital message to the one measuring apparatus;
the data processing device sends additional digital data packets with digital messages to the controller and the controller sends the digital messages to the one measuring apparatus;
the data processing device sends a digital data packet with a digital message and with an end signal to the controller; and
the repeated execution of the exchange steps, which is started with a predefined time lag, is resumed by the controller.

7. A measured data recording system comprising:
a plurality of measuring apparatuses, an unambiguous code being assigned to each of the plurality of measuring apparatuses;
a controller;
a measuring line between each measuring apparatus and the controller for sending analog measured signals by the measuring apparatuses to the controller via the measuring lines and exchanging digital messages, via the measuring lines, between the controller and the measuring apparatuses;
a data processing device;
a terminal connection connecting the data processing device to the controller via a terminal of the controller for receiving digital data packets at the controller from the data processing device and sending digital data packets to the data processing device, the data processing device being configured to send a first digital data packet to the controller, wherein the first digital data packet contains the unambiguous code of one of a plurality of measuring apparatuses and a first digital message, the controller being configured to:
repeatedly execute exchange steps, wherein an exchange step comprises:
  a reception of analog measured signals from the measuring apparatuses; or
  a digital exchange of digital messages between the measuring apparatuses and the controller; or
  both the reception of analog measured signals from the measuring apparatuses and the digital exchange of digital messages between the measuring apparatuses and the controller;
start each of the exchange steps after a predefined time lag;
receive the first digital data packet sent by the data processing, wherein the first digital data packet contains the unambiguous code of the one of a plurality of measuring apparatuses and the first digital message;
extract the code from the first digital data packet; and
send the first digital message to the one of the plurality of measuring apparatuses by the controller after a completion of one of the exchange steps.

8. A measured data recording system in accordance with claim 7, wherein the one measuring apparatus is configured to send a digital reply message, as a reply to the first digital message sent by the controller, to the controller and the controller is configured to send the digital reply message in a digital reply data packet to the data processing device.

9. A measured data recording system in accordance with claim 7, wherein:
the controller is configured to determine a free time that remains until a start of a next exchange step after a completion of an exchange step and compares the free time that remains with a first transmission time, which is needed for sending the first digital message to the one measuring apparatus;
the controller is configured to send the first digital message if the free time is longer than the first transmission time, and
the controller is configured to send the first digital message after the execution of the next exchange step if the free time is shorter than the first transmission time.

10. A measured data recording system in accordance with claim 7, wherein:
a shift register is provided connected to or as a part of the controller;
the first digital message is stored in the shift register;
the controller is configured to determine, after the completion of an exchange step, a free time that remains until a start of a next exchange step and to compare the free time with a first transmission time that is needed for sending a next digital message to be output by the shift register to a measuring apparatus; and
the controller is configured such that the next digital message to be output by the shift register is sent and deleted from the shift register if the free time is longer than the first transmission time.

11. A measured data recording system in accordance with claim 10, wherein:
the data processing device is configured to send at least a second digital data packet to the controller;
the second digital data packet contains the code of a second of the plurality of measuring apparatuses and a second digital message;
the second digital message is stored in the shift register;
the controller is configured such that if no additional digital messages are being stored in the shift register, the controller compares a second free time, that remains until the next exchange step, with a second transmission time that is needed for sending the second digital message to the second measuring apparatus;
the controller is configured to send the second digital message to the second measuring apparatus and to delete the second digital message from the shift register if the second free time is longer than the second transmission time; and
the controller is configured to, if additional digital messages are present in the shift register, compare the second free time that remains until the next exchange step with the transmission time that is needed for sending the next digital message outputted from the shift register, send the next digital message and delete the next digital message from the shift register if the second free time is longer than the transmission time needed for sending the next digital message.

12. A measured data recording system in accordance with claim 7, wherein:
the data processing device sends a digital data packet to the controller;
the digital data packet contains the code of one of the plurality of measuring apparatuses, a start signal and a first digital message;

the repeated execution of the exchange steps is interrupted by the controller;

the controller extracts the code from the digital data packet and sends the digital message to the one measuring apparatus;

the data processing device sends additional digital data packets with digital messages to the controller and the controller sends the digital messages to the one measuring apparatus;

the data processing device sends a digital data packet with a digital message and with an end signal to the controller; and the repeated execution of the exchange steps, which is started with a predefined time lag, is resumed by the controller.

13. A measured data recording system comprising:

a plurality of measuring apparatuses, an unambiguous code being assigned to each of the plurality of measuring apparatuses;

a controller;

a measuring line between each measuring apparatus and the controller for sending analog measured signals by the measuring apparatuses to the controller via the measuring lines and exchanging digital messages, via the measuring lines, between the controller and the measuring apparatuses;

a data processing device;

a terminal connection connecting the data processing device to the controller via a terminal of the controller for receiving digital data packets at the controller from the data processing device and sending digital data packets to the data processing device, the data processing device being configured to send a first digital data packet to the controller, wherein the first digital data packet contains the unambiguous code of one of a plurality of measuring apparatuses and a first digital message, the controller being configured to:

repeatedly execute exchange steps, wherein an exchange step comprises:
 a reception of analog measured signals from the measuring apparatuses; or
 a digital exchange of digital messages between the measuring apparatuses and the controller; or
 both the reception of analog measured signals from the measuring apparatuses and the digital exchange of digital messages between the measuring apparatuses and the controller, wherein the exchange steps are started with a predefined time lag;

receive the first digital data packet sent by the data processing, wherein the first digital data packet contains the unambiguous code of the one of a plurality of measuring apparatuses and the first digital message;

extract the code from the first digital data packet; and send the first digital message to the one of the plurality of measuring apparatuses by the controller after a completion of the exchange step, wherein a shift register is provided connected to or as a part of the controller;

the first digital message is stored in the shift register;

the controller is configured to determine, after the completion of one of the exchange steps, a free time that remains until a start of a next exchange step and to compare the free time with a first transmission time that is needed for sending a next digital message to be output by the shift register to a measuring apparatus; and the controller is configured such that the next digital message to be output by the shift register is sent and deleted from the shift register if the free time is longer than the first transmission time.

14. A measured data recording system in accordance with claim 13, wherein the one measuring apparatus is configured to send a digital reply message, as a reply to the first digital message sent by the controller, to the controller and the controller is configured to send the digital reply message in a digital reply data packet to the data processing device.

15. A measured data recording system in accordance with claim 13, wherein:

the data processing device is configured to send at least a second digital data packet to the controller;

the second digital data packet contains the code of a second of the plurality of measuring apparatuses and a second digital message;

the second digital message is stored in the shift register;

the controller is configured such that if no additional digital messages are being stored in the shift register, the controller compares a second free time, that remains until the next exchange step, with a second transmission time that is needed for sending the second digital message to the second measuring apparatus;

the controller is configured to send the second digital message to the second measuring apparatus and to delete the second digital message from the shift register if the second free time is longer than the second transmission time; and the controller is configured to, if additional digital messages are present in the shift register, compare the second free time that remains until the next exchange step with the transmission time that is needed for sending the next digital message outputted from the shift register, send the next digital message and delete the next digital message from the shift register if the second free time is longer than the transmission time needed for sending the next digital message.

16. A measured data recording system in accordance with claim 13, wherein:

the data processing device sends a digital data packet to the controller containing the code of one of the plurality of measuring apparatuses, a start signal and a first digital message;

the repeated execution of the exchange steps is interrupted by the controller upon or after receipt of the digital data packet with the start signal;

the controller extracts the code from the digital data packet and sends the digital message to the one measuring apparatus;

the data processing device sends additional digital data packets with digital messages to the controller and the controller sends the digital messages to the one measuring apparatus during the interruption in the exchange steps;

the data processing device sends a digital data packet with a digital message and with an end signal to the controller; and the repeated execution of the exchange steps, which is started with a predefined time lag, is resumed by the controller.

* * * * *